United States Patent [19]

Little et al.

[11] Patent Number: 5,406,741
[45] Date of Patent: Apr. 18, 1995

[54] RODENT TRAP USING INCLINED SCREEN

[76] Inventors: L. Frank Little, 15 Ashley Dr., Dillsburg, Pa. 17019-9417; Kim M. Little, 3001 Park Center Dr., #211, Alexandria, Va. 22302

[21] Appl. No.: 147,960

[22] Filed: Nov. 4, 1993

[51] Int. Cl.6 .................................................... A01M 23/08
[52] U.S. Cl. ............................................... 43/65; 43/64
[58] Field of Search ................. 43/64, 60, 79, 107, 43/121, 131, 65

[56] References Cited

U.S. PATENT DOCUMENTS

| 111,291 | 1/1871 | Williams | 43/121 |
|---|---|---|---|
| 115,215 | 5/1871 | Keep | 43/121 |
| 119,435 | 9/1871 | Webb | 43/121 |
| 713,803 | 11/1902 | Rothweiler | 43/121 |
| 930,558 | 8/1909 | McGarvey | 43/65 |
| 1,002,919 | 9/1911 | Knox | 43/121 |
| 1,018,277 | 2/1912 | Suhre | 43/65 |
| 1,077,912 | 11/1913 | Johansson | 43/69 |
| 1,689,529 | 10/1928 | Knapp | 43/65 |
| 2,054,730 | 9/1936 | Pierpoint | 43/121 |
| 2,997,806 | 8/1961 | Duvall | 43/121 |
| 4,241,531 | 12/1980 | Nelson et al. | 43/69 |
| 4,608,774 | 9/1986 | Sherman | 43/121 |
| 4,876,821 | 10/1989 | Benzie | 43/69 |
| 4,879,836 | 11/1989 | Dolyny | 43/64 |

FOREIGN PATENT DOCUMENTS

| 2901832 | 7/1980 | Germany | 43/65 |
|---|---|---|---|
| 2097235A | 11/1092 | United Kingdom | 43/60 |
| 2659 | of 1894 | United Kingdom | 43/121 |
| 444794 | 3/1936 | United Kingdom | 43/65 |

Primary Examiner—P. Austin Bradley
Assistant Examiner—Jeanne M. Elpel
Attorney, Agent, or Firm—Saidman Designlaw Group

[57] ABSTRACT

A rodent trap characterized by a container with an inclined sidewall that has a screen covering same. Bait in the form of a band of peanut butter is placed on the inside of the container, approximately mid-height, and the bottom of the container is filled with an oil and antifreeze mixture. The rodent climbs the outside wire mesh and, in a vain attempt to reach the bait, falls into the liquid mixture and drowns.

8 Claims, 1 Drawing Sheet

U.S. Patent   Apr. 18, 1995   5,406,741
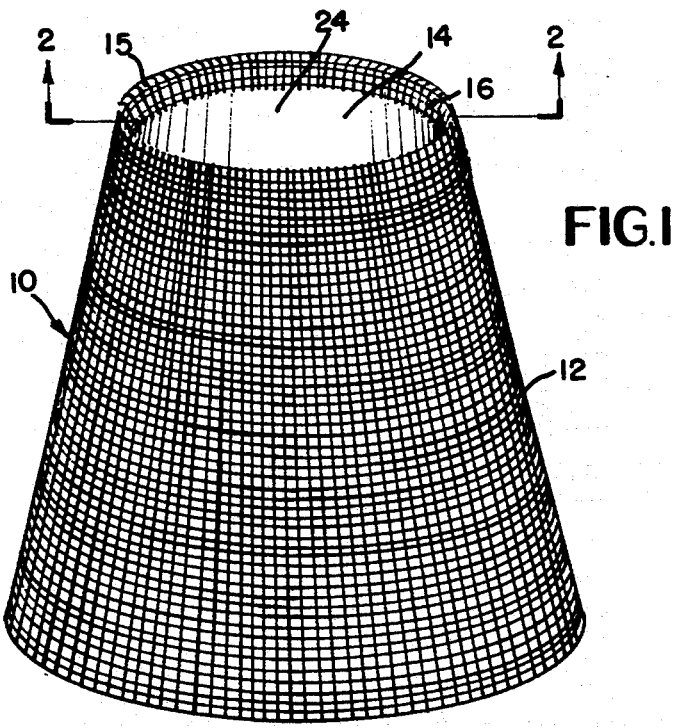
FIG. 1
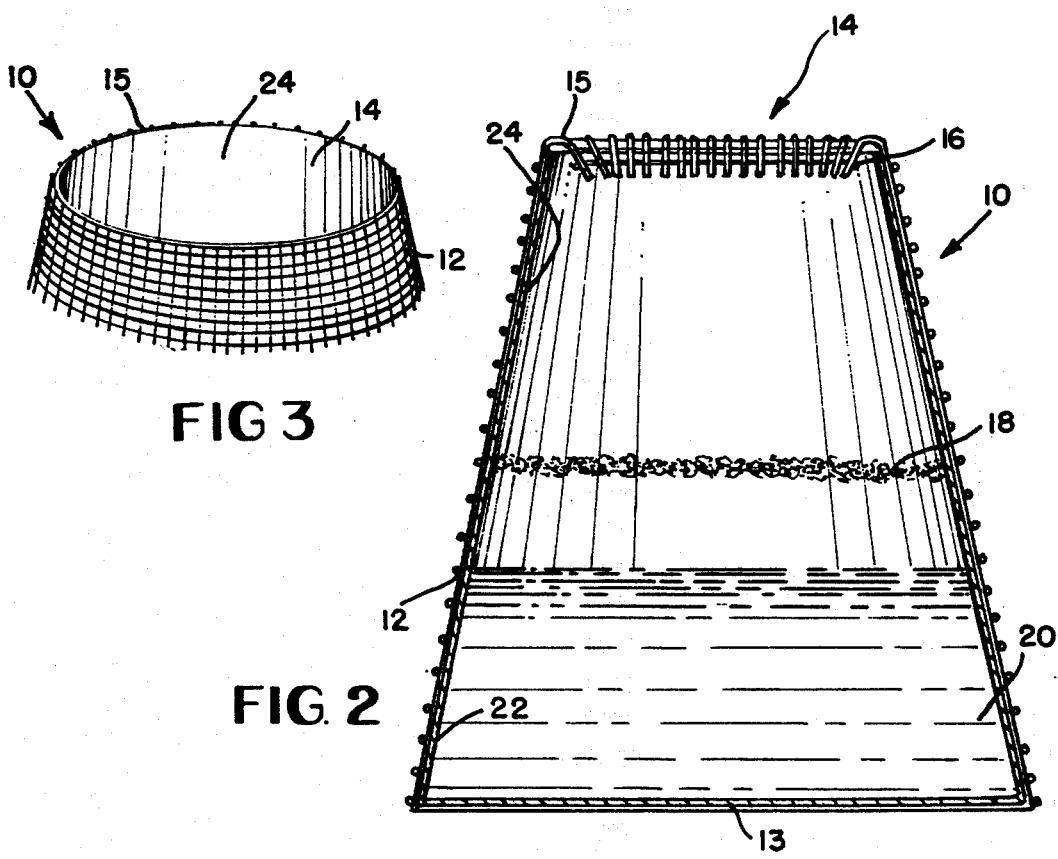
FIG. 3
FIG. 2

RODENT TRAP USING INCLINED SCREEN

BACKGROUND OF THE INVENTION

1. Field of the Invention

The present invention relates to an animal trap and, more particularly, is directed towards a rodent trap which is designed for use either outdoors or indoors.

2. Description of Related Arts

Animal traps designed to catch rodents and mice are well-known. However, animal traps of the prior art are generally either too complex in construction, too expensive to produce, or provide ineffectual results. Illustrative prior art rodent and other animal traps are found in the following U.S. and foreign patents:

McGarvey (U.S. Pat. No. 930,558) teaches a hook S2 having bait attached thereto and positioned over a trap door D that opens into a tank A containing water.

Knox (U.S. Pat. No. 1,002,919) teaches a trap having a curved upper edge 7 overhanging a compartment 8 filled with water or oil.

The Suhre patent (U.S. Pat. No. 1,018,277) teaches a trap having a funnel shaped member 5 the underside of which is coated with bait. The bait attracts the roach into the funnel 5 which then slides down into the liquid A therebelow.

The Johansson patent (U.S. Pat. No. 1,077,912) teaches a mouse trap comprising a tank 5 that contains water. The upper end of tank 5 is open and may be reached by a mouse by means of a piece of wire gauze 6 that is attached at its lower end to the bottom of tank 5 and which extends vertically along its outer surface and is secured at its upper end to the rim of tank 5. Bait 13 is placed below and to the side of opening 8. The mouse, attracted by the bait 13, will fall onto a trap door 16 which opens to the water below.

Knapp (U.S. Pat. No. 1,689,529) discloses another rat trap that uses a reticulated ramp 4 that leads to the top of a cylindrical container 1 that contains water at the bottom. An annular trough 10 extends around the inside of cylinder 2 and is filled with bait.

Pierpoint (U.S. Pat. No. 2,054,730) teaches a trap that employs angular ledges 8 and 10 which overhang the top of the trap body 5. The animals fall from ledges 8 and 10 into the water below.

The U.K. patent to Holst (444,794) teaches a rat trap comprising a vessel 1 partially filled with water. An inclined plane 3 has bait hidden therein. The animals upon reaching the top of the inclined plane arrive at the edge of a funnel 6 made of very smooth material. Funnel 6 has holes 7 under which bait is placed. When trying to follow the smell of the bait to the bottom of the funnel, the animals slip on the smooth inner surface of the funnel and fall through the hole 8 into the water.

The German patent to Spratten (29 01 832) teaches a very similar trap. A funnel 2 overlies the top edge of a container 1 and contains bait 6. Gaseous carbon dioxide is used to kill the animal.

The UK Patent Application to Murakami (GB 2 097 235 A) teaches an electromagnetic device that opens a trap door when the bait is touched, dropping the animal into the liquid below.

Most of the above-noted structures comprise multi-piece constructions which require hand labor to assemble or finish, thereby increasing the cost. Further, despite the claims made for them, most are ineffectual in producing the desired results.

OBJECTS AND SUMMARY OF THE INVENTION

It is therefore a primary object of the present invention to provide a rodent trap which is simple in construction, low cost, and effective.

Another object of the present invention is to provide a novel and unique rodent trap which may be used indoors or outdoors in sub-zero temperatures without any loss in effectiveness.

A further object of the present invention is to provide a rodent trap which has no moving parts, is of simple and straightforward construction, and which catches rodents effectively.

A still further object of the present invention is to provide a rodent trap which uses means for facilitating capture of the rodent and which, using the same means, helps prevent the rodent from escaping once caught.

The foregoing and other objects are achieved in accordance with one aspect of the present invention through the provision of a rodent trap which comprises a container having a closed bottom end defining a bottom portion, an upper edge defining an open top end, and a side wall extending from the bottom end to the upper edge. More particularly, the side wall is preferably inclined and includes an outside surface and an inside surface.

Even more particularly, the rodent trap includes screen means positioned along the outside surface of the inclined sidewall of the container for permitting a rodent to climb up the sidewall to the open top end of the container. Bait means are positioned preferably on the inside surface of the inclined sidewall of the container, approximately midway between the open top end and the closed bottom end thereof. Finally, liquid means are positioned in the bottom portion of the container into which the rodent falls so as to be drowned therein.

In accordance with further aspects of the present invention, the sidewall of the container is preferably shaped like a truncated cone. The screen means preferably comprises a wire mesh screen which may be positioned on substantially the entirety of the outside surface of the container.

In accordance with another aspect of the present invention, the wire mesh screen may extend only to the upper edge of the container. Alternatively, the wire mesh screen may include a bent over portion that extends from the upper edge of the container so as to extend into the open end of the container. Such bent over portion is preferably inclined, and is relatively short, terminating in the open end.

In accordance with other aspects of the present invention, the liquid means preferably comprises a mixture of antifreeze and oil. The antifreeze and oil are preferably mixed in a ratio of approximately eight to one, respectively.

In accordance with another aspect of the present invention, the bait means preferably comprises peanut butter which may be spread horizontally in a relatively thin band or stripe about the entirety of the inside surface of the inclined sidewall.

BRIEF DESCRIPTION OF THE DRAWINGS

The foregoing and other objects, aspects and features of the present invention will be more fully appreciated as the same becomes better understood form the following detailed description of the present invention viewed in conjunction with the accompanying drawings, in which:

FIG. 1 is a top, perspective view of a preferred embodiment of the rodent trap of the present invention;

FIG. 2 is a vertical sectional view of the preferred embodiment of FIG. 1 taken along line 2—2 thereof; and FIG. 3 is a partial, top, perspective view illustrating an alternate embodiment of the present invention.

DETAILED DESCRIPTION OF THE PREFERRED EMBODIMENT

Referring now to the drawings, wherein like reference numerals represent identical or corresponding parts throughout the several views, FIG. 1 is a top, perspective view of a preferred embodiment of the present invention which comprises a rodent trap including a container indicated generally by reference numeral 10. Container 10 may be made of either plastic or metal and has a preferred overall height of approximately 20 inches.

Container 10 is preferably shaped in the form of an inverted, truncated cone having an inclined sidewall 11 (FIG. 2) that extends about the entire circumference of container 10. Container 10 further includes a closed or bottom end 13 which forms the lowermost portion and is connected at its periphery to sidewall 11. The upper end of sidewall 11 terminates in an upper edge 15 which defines an open end that is indicated generally by reference numeral 14.

Covering the entire outside surface of container 10 is a wire mesh screen 12. Screen 12 is preferably an $\frac{1}{8}''-\frac{1}{4}''$ wire mesh, although plastic mesh may be used. The purpose of screen 12 is to provide a readily accessible foothold for rodents to climb the inclined sidewall 11 of container 10.

In this first embodiment, the upper portion of screen 12 is preferably bent over the upper edge 15 of container 10 so as to form a protrusion or bent-over portion which is indicated generally by reference numeral 16. Protrusion 16 extends into open end 14 of container 10 and is preferably inclined angularly downwardly and inwardly, as illustrated most clearly in FIG. 2. The length of protrusion 16 is preferably on the order of one inch. Protrusion 16 provides a foothold for the rodent from which the rodent hangs while attempting to get to the bait.

On the inside wall 24 of sidewall 11, approximately midway between the bottom end 13 and the upper edge 15, is located bait 18 which preferably takes the form of a horizontal stripe or band of peanut butter that extends about the entire internal periphery of the sidewall 24. Although shown at the approximate mid-level between bottom end 13 and upper edge 15, bait 18 may be placed between 7 and 10 inches below upper edge 15 (assuming an overall height of 20 inches for container 10).

Positioned at the bottom of container 10 is a liquid mixture which preferably comprises antifreeze and oil. The purpose of the antifreeze is to permit usage of the rodent trap in sub-freezing weather outdoors, and the purpose of the oil is to kill the rodents more humanely (i.e., quicker) than would another liquid, such as water. The preferred mixture of antifreeze and oil is two gallons of antifreeze to one quart of oil. Mixture 20 is on the order of six to eight inches deep (again assuming an overall height of 20'' for container 10).

In use, the rodent is attracted by the smell of the peanut butter 18 so as to climb the outside screen 12 to the upper edge 15 of container 10. Upon reaching the open end 14, there is a much stronger scent of peanut butter 18, whereupon the rodent likely hangs from the protrusion 16 downwardly into container 10 in an attempt to reach the peanut butter 18. Eventually, the rodent will fall into mixture 20 and drown. The internal inclined wall 24 makes it difficult for the rodent to escape once it is inside container 10.

FIG. 3 illustrates an alternate embodiment whereby screen 12 terminates at the upper edge 15 instead of extending into the open end 14 of container 10. In this embodiment, the rodent has less of a perch to hang onto, and thereby may be more easily inclined to drown in mixture 20 in a vain attempt to reach the peanut butter 18.

Numerous modifications and variations of the present invention are possible in light of the above teachings. For example, instead of a green covering container 10, a cork surface could be used. It is therefore to be understood that within the scope of the appended claims, the invention may be practiced otherwise than as specifically described herein.

We claim as our invention:

1. A rodent trap, comprising:
   (a) a container having a closed bottom end defining a bottom portion, an upper edge defining an open top end with an opening, and a sidewall extending from said bottom end to said upper edge, said sidewall being shaped like a truncated cone and being inclined and having an outside surface and an inside surface;
   (b) screen means comprising a wire mesh screen positioned along said outside surface of said inclined sidewall of said container and extending up to said opening of said container for permitting a rodent to climb up said sidewall to said opening of said container;
   (c) bait means positioned on said inside surface of said inclined sidewall of said container, approximately midway between said open top end and said closed bottom end thereof; and
   (d) liquid means positioned in said bottom portion of said container into which said rodent falls so as to be drowned therein.

2. The rodent trap as set forth in claim 1, wherein said wire mesh screen is positioned on substantially the entirety of said outside surface of said container.

3. The rodent trap as set forth in claim 1, wherein said liquid means comprises a mixture of antifreeze and oil.

4. The rodent trap as set forth in claim 3, wherein said antifreeze and said oil are mixed in a ratio of approximately eight to one, respectively.

5. A rodent trap, comprising:
   (a) a container having a closed bottom end defining a bottom portion, an upper edge defining an open top end, and a sidewall extending from said bottom end to said upper edge, said sidewall being inclined and having an outside surface and an inside surface;
   (b) screen means positioned along said outside surface of said inclined sidewall of said container for permitting a rodent to climb up said sidewall to said open top end of said container;

(c) bait means positioned on said inside surface of said inclined sidewall of said container, approximately midway between said open top end and said closed bottom end thereof; and (d) liquid means positioned in said bottom portion of said container into which said rodent falls so as to be drowned therein;

wherein said screen means comprises a wire mesh screen, and wherein said wire mesh screen further includes a bent over portion that extends from said upper edge of said container so as to extend into said open end of said container.

6. The rodent trap as set forth in claim 5, wherein said bent over portion is inclined.

7. The rodent trap as set forth in claim 6, wherein said bent over portion is relatively short, terminating in said open end.

8. A rodent trap, comprising:
(a) a container having a closed bottom end defining a bottom portion, an upper edge defining an open top end, and a sidewall extending from said bottom end to said upper edge, said sidewall being shaped like a truncated cone and being inclined and having an outside surface and an inside surface;

(b) screen means comprising a wire mesh screen positioned on substantially the entirety of said outside surface of said inclined sidewall of said container for permitting a rodent to climb up said sidewall to said open top end of said container;

(c) bait means positioned on said inside surface of said inclined sidewall of said container, approximately midway between said open top end and said closed bottom end thereof; and (d) liquid means positioned in said bottom portion of said container into which said rodent falls so as to be drowned therein;

wherein said bait means comprises peanut butter, and wherein said peanut butter is spread horizontally in a relatively thin stripe about the said inside surface of said inclined sidewall.

* * * * *